April 24, 1945.   P. F. SPERRY   2,374,509
REWINDING MECHANISM FOR CAMERAS
Original Filed Nov. 17, 1941    2 Sheets-Sheet 1
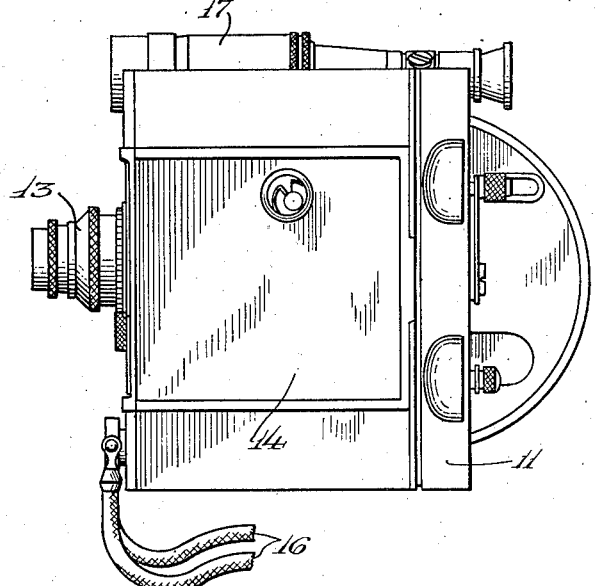
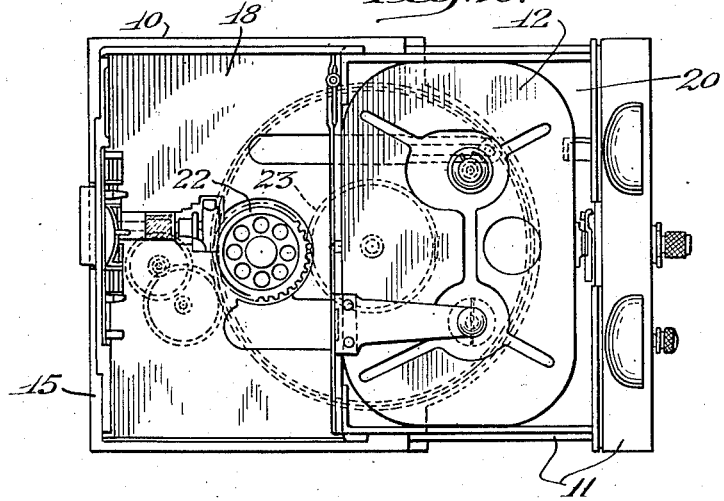
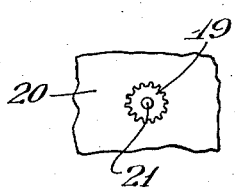

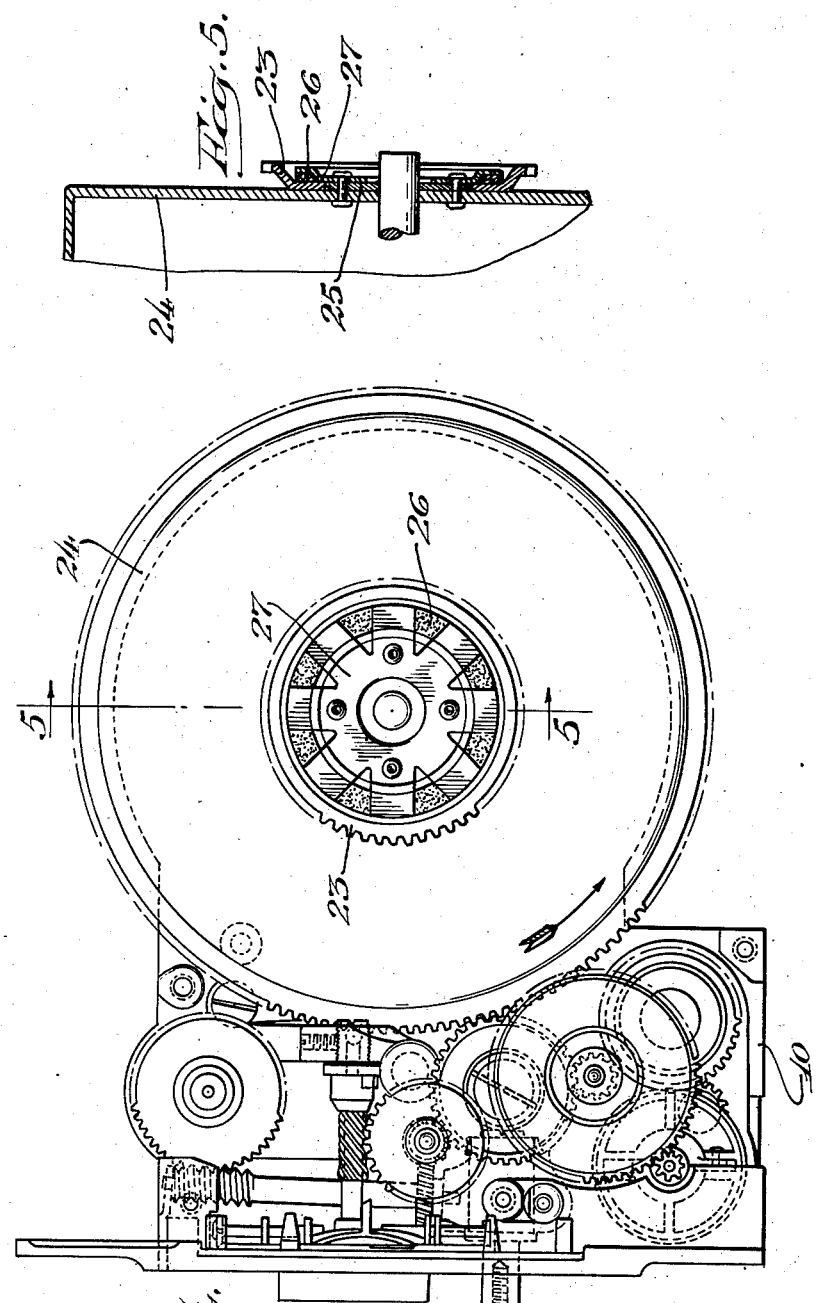

Patented Apr. 24, 1945

2,374,509

UNITED STATES PATENT OFFICE 2,374,509

REWINDING MECHANISM FOR CAMERAS

Philmore F. Sperry, deceased, late of Chicago, Ill., by Helen B. Sperry, executrix, Chicago, Ill., assignor, by mesne assignments, to Theodore H. Briskin, Philip F. Briskin, and Jack Briskin Original application November 17, 1941, Serial No. 419,457. Divided and this application November 23, 1942, Serial No. 466,598

4 Claims. (Cl. 64—30)

This application is being filed as a division of the co-pending application of Philmore F. Sperry, Serial No. 419,457, filed November 17, 1941, now Patent No. 2,323,576. This invention relates to motion picture cameras of the type in which a film is mounted in the camera in a lightproof magazine having a shutter closing an exposure opening at the front face of the magazine, such magazine being supported in the camera chamber so as to be movable forwardly and backwardly into and out of operative position with respect to the lens means at the front of the casing.

It is the principal object of the present invention to provide an improved construction of driving and controlling means for moving the film through the camera for the exposure of successive portions of the film, and it relates particularly to an improved arrangement of parts for rewinding the film while still retained within the magazine after the exposure.

This mechanism comprises improved means for actuating the rewinding parts so as to permit the driving mechanism to slip to the necessary extent with respect to the reel upon which the film is being rewound so as to accommodate the changing effective size of the rewinding reel as the film is wound gradually thereon.

It is another object of the invention to improve devices of this type in sundry details hereinafter pointed out. The preferred means by which the several objects have been attained are illustrated in the accompanying drawings, in which—

Fig. 1 is a side face view of a camera embodying the invention;

Fig. 2 is a view similar to Fig. 1 but with the side plate and the front facing plate of the casing and the view finder all removed, and with the magazine carrier moved to its rearmost open position;

Fig. 3 is a face view of a fragmentary portion of a vertical wall of the carrier against which a magazine is positioned;

Fig. 4 is a side view of the operating parts of the camera, with the principal housing member and the magazine carrier and the adjacent partition frame plate all removed for clearness of illustration; and Fig. 5 is a vertical sectional view taken substantially at the line 5—5 of Fig. 4.

In the drawings, 10 indicates the casing of a camera embodying the improvements, comprising a carrier 11 in the form of a drawer slidable forwardly and backwardly in the casing for carrying a film magazine 12 into and out of operative position with respect to a lens system 13 at the front face of the casing. A side plate 14 carried by the casing serves to close the face of the drawer 11 when the drawer is in its forward position. A front plate 15 upon which the lens system 13 is mounted is provided with a carrying loop 16 of any approved type. A view finder 17 is mounted in convenient position at the upper face portion of the casing. A partition plate 18 serves to separate the chamber within which the drawer 11 is mounted from the adjacent space within the casing.

In the arrangement shown in Fig. 4, a mass of mechanism is shown at the left for driving and controlling the several parts of the camera. Inasmuch as this mechanism forms in and of itself no part of the present invention and is described more or less in detail in said prior application Serial No. 419,457, it is believed to be unnecessary to describe the same herein.

The means for driving the rewinding reel of the film magazine 12 comprises a pinion 19 mounted on the outer face of the side wall 20 of the drawer 11, such pinion being mounted by means of a shaft 21 which in the operative arrangment of the parts is operatively connected with the lower reel of the magazine for rotating such reel for rewinding the film thereon. The arrangement of the parts in the magazine by which the pinion 19 and shaft 21 are enabled to drive the rewinding reel form no part of this invention. For actuating the pinion 19 and the shaft 21, an idler gear 22 is rotatably mounted on the partition plate 18 in position to be engaged by the pinion 19 when the drawer 11 is moved forwardly to the limit of its motion, such idler gear 22 meshing with a gear 23 carried by the motor housing 24 through which power is transmitted from the spring motor mounted in said housing.

The means for mounting the gear 23 upon the motor housing 24 comprises a round disc 25 fixedly mounted on the cross plate portion of the housing so as to support the gear 23 rotatably in position, the gear 23 being in the form of a ring having a working fit about the disc. Next to the gear 23, a friction plate 26 in the form of a ring or washer of cork is loosely mounted in position, such ring 26 being pressed against the face of the gear by means of a spring plate 27 in the form of a spider, the arms of which engage the outer face of the friction ring 26, the spring plate 27 being connected with the housing 24 so as to rotate therewith. The arrangement is such that power is applied frictionally from the housing 24 and the spring 27 through the friction ring 26 to the gear 23.

The gear 23 and its cooperating driving train parts are arranged so as normally to drive the rewinding reel of the magazine at the maximum speed required for effectively rewinding the film at the start of the use of a fresh film. As the effective diameter of the rewinding reel increases by reason of the accumulation of the film thereon, the gear 23 slips with respect to the housing 24 so as to insure that the film shall be wound snugly upon the reel without injuring the reel or the film, as is well understood in devices of this type.

While the form and arrangement of parts as above described are preferred, the invention is not to be limited thereto except so far as the claims may be so limited, it being understood that changes might well be made in the form and arrangement of the parts without departing from the spirit of the invention.

What is claimed is:

1. A rewinding mechanism for a film camera, comprising in combination a motor having a housing member through which power is transmitted, a disc mounted on the outer face of the housing, a ring gear rotatably mounted about said disc, a friction plate in the form of a ring loosely mounted on the outer face of the gear, and a spring member in the form of a spider carried by said housing with its arms bearing on the outer face of the friction ring so as to cause said gear to rotate by friction with said housing.

2. A rewinding mechanism for a film camera, comprising in combination a motor having a housing member through which power is transmitted, a disc mounted on the outer face of the housing, a ring gear rotatably mounted about said disc, a cork ring loosely mounted on the outer face of the gear, and a spring member in the form of a spider carried by said housing with arms bearing on the outer face of the cork ring so as to cause said gear to rotate by friction with said housing.

3. A rewinding mechanism for a film camera, comprising in combination a rotatably mounted plate through which power is transmitted, a disc fixedly mounted on the face of said plate, a ring gear rotatably mounted on the face of the plate about said disc, a friction plate also in the form of a ring mounted movably on the outer face of the gear, and spring means mounted on said disc so as to rotate with said first named plate and serving to press said friction plate against said gear for rotating the gear by friction.

4. A rewinding mechanism for a film camera, comprising in combination a rotatably mounted plate through which power is transmitted, a disc fixedly mounted on the face of said plate, a ring gear rotatably mounted on the face of the plate about said disc, a friction plate also in the form of a ring mounted movably on the outer face of the gear, and a spring member in the form of a spider formed of thin resilient metal mounted on said disc so as to rotate with said first named plate with its arms bearing on the outer face of the friction ring for pressing said friction ring against said ring gear and thus causing the ring gear to rotate by friction with said first named rotatably mounted plate.

HELEN B. SPERRY,
*Executrix of the Estate of Philmore F. Sperry, Deceased.*